(12) United States Patent
Litty et al.

(10) Patent No.: US 9,037,873 B2
(45) Date of Patent: May 19, 2015

(54) METHOD AND SYSTEM FOR PREVENTING TAMPERING WITH SOFTWARE AGENT IN A VIRTUAL MACHINE

(71) Applicant: VMware, Inc., Palo Alto, CA (US)

(72) Inventors: Lionel Litty, Palo Alto, CA (US); Marios Leventopoulos, Palo Alto, CA (US); Joshua Schwartz, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 223 days.

(21) Appl. No.: 13/754,662

(22) Filed: Jan. 30, 2013

(65) Prior Publication Data

US 2014/0215226 A1   Jul. 31, 2014

(51) Int. Cl.
| | |
|---|---|
| *G06F 21/53* | (2013.01) |
| *G06F 21/50* | (2013.01) |
| *G06F 21/54* | (2013.01) |
| *G06F 21/64* | (2013.01) |
| *G06F 21/56* | (2013.01) |
| *G06F 12/10* | (2006.01) |

(52) U.S. Cl.
CPC ............. *G06F 21/53* (2013.01); *G06F 21/50* (2013.01); *G06F 21/54* (2013.01); *G06F 21/64* (2013.01); *G06F 21/565* (2013.01); *G06F 12/10* (2013.01); *G06F 2212/151* (2013.01)

(58) Field of Classification Search
CPC .... G06F 21/00; G06F 12/10; G06F 2212/151; G06F 21/10; G06F 21/50; G06F 21/53; G06F 21/565; G06F 21/60; G06F 21/64
USPC ........................................... 726/22; 713/193
See application file for complete search history.

(56) References Cited

U.S. PATENT DOCUMENTS

| | | | |
|---|---|---|---|
| 8,225,317 B1 * | 7/2012 | Chiueh et al. ...................... 718/1 |
| 2007/0055837 A1 * | 3/2007 | Rajagopal et al. ............ 711/163 |

* cited by examiner

*Primary Examiner* — Jung Kim
*Assistant Examiner* — Ayoub Alata

(57) ABSTRACT

Techniques are disclosed for monitoring a software agent running in a virtual machine to prevent execution of the software agent from being tampered with. In one embodiment, the software agent bootstraps such monitoring by ensuring that its code is present in memory and providing the code, memory addresses associated with the code, and a cryptographic signature of the code, to a monitoring process upon request. In response to receiving the code, the monitoring process checks the code using the cryptographic signatures and further ensures that the code is present in memory at the provided address. The monitoring process may then placing write traces on all memory pages of the agent and execution trace(s) on certain pages of the agent. By tracking writes to and execution of the respective pages, the monitoring process may determine whether the agent has been modified and whether the agent is still running.

18 Claims, 3 Drawing Sheets

METHOD AND SYSTEM FOR PREVENTING TAMPERING WITH SOFTWARE AGENT IN A VIRTUAL MACHINE

BACKGROUND

A virtual machine (VM) is an abstraction—a virtualization—of an actual physical computer system. The VM, also known as the "guest," is installed on a host computer platform, which includes system hardware and one or more virtualization layers. Each VM is configured with its own operating system that runs on top of virtual system hardware as emulated by the virtualization layers. To the running operating system, the virtualization is generally transparent. That is, the guest operating system is not "aware" that it is not running directly on a physical CPU and accompanying hardware.

It is not uncommon for virtual datacenter solutions to use an in-guest component (also referred to herein as "in-guest agent") to gather information about guest VMs or detect the occurrence of specific events in the VMs. Such information may be used to manage the VMs or monitor the performance or security of the VMs. For example, antivirus software which would otherwise run in a guest VM may be offloaded to a dedicated security VM (SVM), and the in-guest agent may leverage services provided by the guest VM's operation system (OS) to access information pertaining to files being accessed, processes running on the guest OS, etc. and provide such information to the antivirus software in the SVM. In turn, the antivirus software may perform a virus scan using the information provided by the in-guest agent.

Because the in-guest agent executes in the guest VM, the in-guest agent is vulnerable to tampering by other software entities inside that same VM. For example, malicious entities may attempt to alter the agent's code in memory or disable the agent to evade detection by antivirus software external to the VM that relies on the in-guest agent.

One approach to secure the in-guest agent is to install the agent as a kernel-level driver on the guest operating system (OS). Malicious entities without sufficient privilege may then lack direct access to resources used by in-guest agent. Nonetheless, malicious entities may gain access to such resources by, e.g., elevating their privilege levels, and thereafter tamper with the agent's code or disable the agent.

SUMMARY

Embodiments presented herein provide techniques to prevent tampering with a software component in a guest virtual machine. The techniques include determining, by the software component, that code of the software component resides in non-pageable memory, and transmitting, from the software component to a monitoring process external to the guest virtual machine, locations in non-pageable memory at which the code is loaded. The techniques further include validating, by the monitoring process, that the locations in non-pageable memory store code of the software component, and placing, by the monitoring process, at least one of execution and write traces on one or more of the memory pages on which the code is loaded. In addition, the techniques include monitoring, via the execution and write traces, execution of, and writes to, the one or more of the memory pages on which the code is loaded, respectively.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein provide techniques for monitoring a software agent running in a virtual machine to prevent execution of the agent from being tampered with. In one embodiment, the software agent bootstraps such monitoring by ensuring that its code is present in memory and providing memory address(es) associated with the code, a disk location of the code, and a cryptographic signature of the code, to a monitoring process. In response to receiving the code, the monitoring process, which may run as a user world process in the virtualization software (also known as the "hypervisor"), checks the code using the cryptographic signatures and further ensures that the code is present in memory at the provided address. The monitoring process may then place write traces on memory pages of the agent and execution trace(s) on certain pages of the agent. By tracking writes to and execution of the respective pages, the monitoring process may determine whether the agent has been modified and whether the agent is still running. If the agent has been modified, or is no longer running, the monitoring process may raise an alarm.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
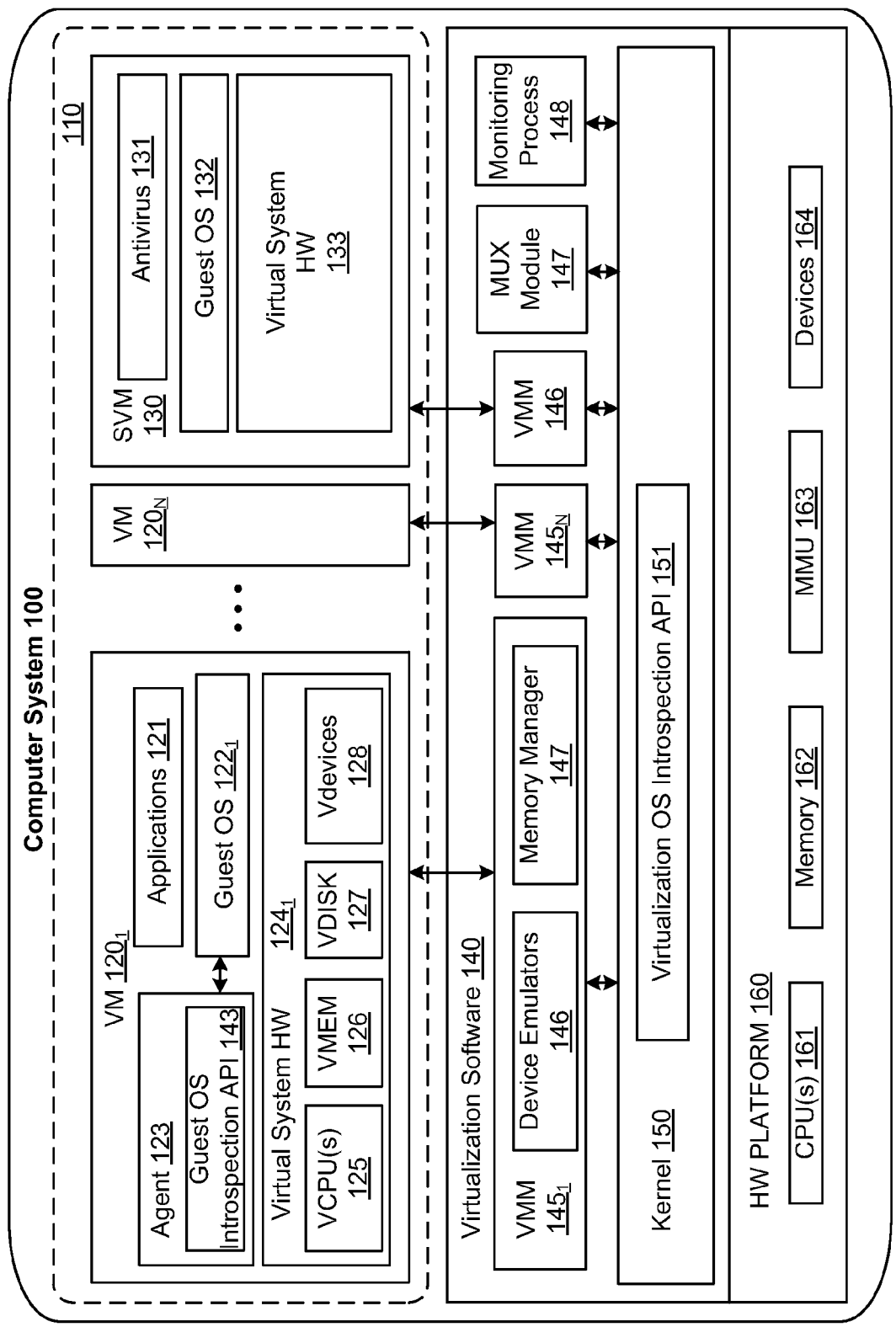
FIG. 1 illustrates a system in which an embodiment of the invention may be practiced.

FIG. 1 illustrates a system in which an embodiment may be practiced. In this embodiment, a computer system 100 is configured with virtualization software 140 installed on top of a hardware platform 160, which may be a conventional, typically server-class hardware platform that includes one or more central processing units (CPUs) 161, memory 162, a memory management unit 163, and other devices 164 (e.g., a host bus adapter). Illustratively, virtualization software 140 supports virtual machine execution space 110 within which virtual machines (VMs) $120_1$-$120_N$ are executed. Virtualization software 140 may run directly on hardware platform 160, or, alternatively, on top of an operating system which itself runs on hardware platform 160. In a particular embodiment, virtualization software 140 may be a VMware ESX Server™.

Each of VMs $120_1$-$120_N$ implements a virtual hardware platform (e.g., virtual system hardware $124_1$-$124_N$) which includes, e.g., virtual CPU(s) 125, virtual memory 126, virtual disk 127, and virtual devices 128. Illustratively, device emulators 146 of a virtual machine monitor $145_1$ (VMM) provide hardware emulation for VMs $120_1$, and VMMs $145_{2-N}$ may include similar device emulators (not shown). The virtual hardware platforms $124_1$-$124_N$ themselves support execution of guest operating systems (e.g., operating systems $122_1$-$122_N$) and client application programs (e.g., applications 121) running on the guest operating systems. Example guest operating systems include Microsoft Windows® and Linux®.

Illustratively, an antivirus process 131 runs on guest OS 132 of a security VM 130, while an in-guest agent 123, which may be, e.g., a kernel driver, runs in VM $120_1$. Security and performance may be enhanced by offloading antivirus functions to process 131, while maintaining only a "thin" agent 123 in VM $120_1$ for gathering and transmitting information about the guest OS $122_1$ (e.g., processes running on the guest OS $122_1$, network access, etc.) and events (e.g., file events) occurring thereon. In particular, the agent 123 may expose only a small attack footprint to malicious entities and the SVM 130, in which antivirus process 131 runs, may be a special tamper-proof VM, thereby providing better security than if the antivirus process 131 were to run in VM $120_1$ itself.

Illustratively, the agent 123 includes a guest OS introspection API 143, which provides introspection into guest OS $122_1$. The antivirus process 131 may gather information about guest OS $122_1$ and events occurring thereon by invoking functions provided by guest OS introspection API 143. The guest OS introspection API 143 may further provide functions for fetching data, deleting and quarantining files, and the like. In one embodiment, the guest OS introspection API 143 may be a multi-layered protocol message. Here, a multiplexer module 147 running on the kernel 150 may read one layer of the protocol to route messages to and from VMs 120, the SVM 130, and the monitoring process 148, thereby providing a communication path between the in-guest agent 123, the SVM 130, and the monitoring process 148. The agent 123 and the antivirus process 131 may read another layer of the protocol that implements guest OS introspection API commands. In a particular embodiment, the guest OS introspection API 143 may be VMware EPSEC API.

Although use of the agent 123 in conjunction with the antivirus process 131 running on a separate VM provides security beyond that available if the antivirus process 131 were to run in VM $120_1$ itself, execution of the agent 123 nonetheless occurs in VM $120_1$. As a result, malware running in VM $120_1$ could potentially tamper with the agent 123 to, e.g., evade detection by the antivirus process 131. A monitoring process 148 running on top of or as a part of kernel 150 is configured to monitor execution of the agent 123 to prevent a malicious entity from tampering with the code of, or disabling, the agent 123. Alternatively, monitoring process 148 may also run in the SVM 130, so long as the monitoring process 148 is not within VM $120_1$ in which the agent 123 being monitored runs.

In one embodiment, the agent 123 may bootstrap such monitoring. As discussed in greater detail below, the agent 123 may ensure that its code is present in non-pageable memory, i.e., memory pages that cannot be paged out. The agent 123 may provide the monitoring process 148 with memory addresses associated with the code, as well as a disk location of the code and a cryptographic signature of the code. In response, the monitoring process 148 may check the code on disk of the agent 123 using the cryptographic signature to confirm that the author of the code is trusted by the monitoring process 148 and to validate that the code has not been altered.

In addition to checking the code on disk, the monitoring process 148 may ensure that the in-guest agent's 123 code is present in memory at the addresses provided by the agent 123. In virtualized systems, a virtual memory page number (VPN) is typically remapped twice in order to determine a page of physical memory 142. For example, a mapping module within guest OS 122 may translate a guest VPN (GVPN) into a corresponding guest physical page number (GPPN) according to a virtual address mapping. A memory management module 147, which is typically located in VMM 145 but may be located elsewhere (e.g., in kernel 150), may then perform a second mapping from the GPPN issued by guest OS 122 into a hardware (or "machine") page number PPN which is used to address physical memory 152 of the underlying hardware platform 150. In other words, the guest OS may "believe" that it is directly addressing hardware using the GPPN, but from the perspective of the system software, the GPPN is a page number which is further mapped to the physical memory space of the hardware memory as a PPN. That being the case, agent 123 may provide GPPN page numbers, and monitoring process 148 may then determine whether the agent's 123 code is present at those memory pages. Illustratively, monitoring process 148 may invoke a virtualization OS introspection API 143 that permits guest VM memory to be inspected, to fetch the contents of the GPPN pages provided by the agent 123. For example, the publically available VMware's vCompute® API may be used where the virtualization software 130 is an ESX Server™. Monitoring process 148 may then compare the code provided by the agent 123 with the actual contents of the GPPN pages to verify that the agent's code is present at the indicated memory addresses. Note, use of GPPN is not critical, as GVPN, GPPN, and machine PPN may readily be translated into each other.

Assuming that the signed code is validated and the code's presence in memory at the addresses provided by the agent 123 is confirmed, the monitoring process 148 may place write traces on all memory pages of the agent's 123 code and execution trace(s) on certain code pages (e.g., memory pages specified in the signed code provided by the agent 123). Write and execution traces are triggered when a VM attempts to write to or execute pages on which the traces are placed, respectively. In response to the traces being triggered, a trace handler may make a callback notifying the monitoring process 148 of the write or execution attempt.

In one embodiment, the monitoring process 148 may invoke virtualization OS introspection API 143 to place write and execution traces. For example, VMware vCompute® API permits traces to be placed at specified GPPN locations. In a further embodiment, write traces may be placed using synchronous execution to avoid potential time of check to time of use (TOCTTOU) issues caused by a race between the monitoring process 148 attempting to place write traces on memory pages and guest VM $120_1$ software attempting to modify those same pages. For example, VM $120_1$ may be suspended while the traces are being placed, and execution of VM $120_1$ may be resumed thereafter. Note, while synchronous execution may make placing write traces less error prone, write traces may be installed asynchronously as well by placing the traces first, then reading the memory content.

By monitoring writes to and execution of memory pages of the agent 123, the monitoring process 148 may determine whether the agent 123 has been modified and whether the agent 123 is still executing. Where a write trace fires, indicating that code of the agent 123 has been modified, or where execution traces do not fire (e.g., do not fire within a t millisecond interval), the monitoring process 148 may raise an alarm. Any feasible response to the alarm raised by the monitoring process 148 may be taken. In an alternative embodiment, the monitored code path may write (e.g., periodically) to a specified page which is monitored via a write trace. In such a case, the monitoring process 148 may raise an alarm when the write trace fails to fire, indicating that the agent 123 has stopped executing.

Figure 2:
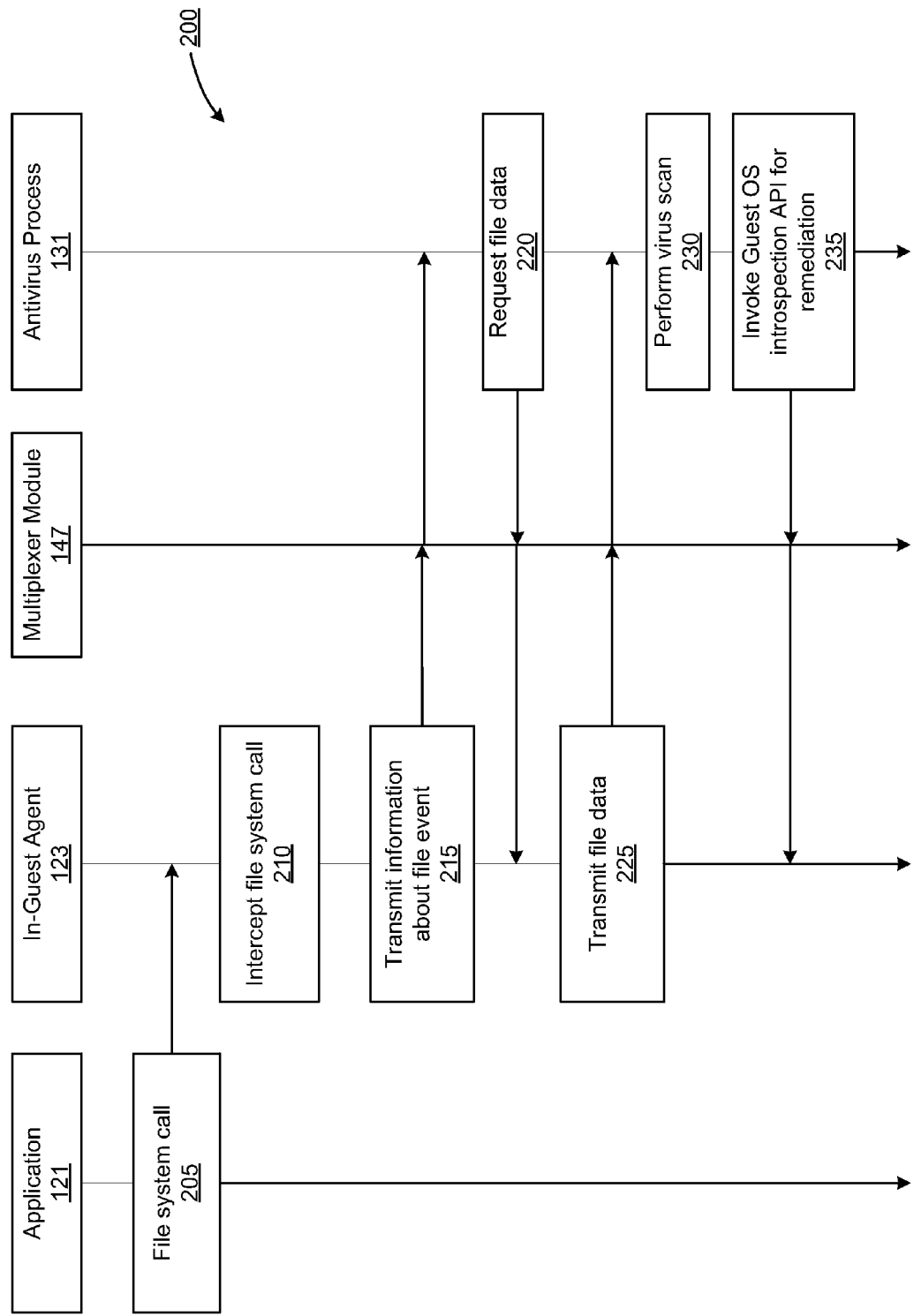
FIG. 2 illustrates a method for performing an on-access virus scan.

FIG. 2 illustrates a method 200 for performing an on-access virus scan. On-access scans are virus scans triggered upon certain file events (e.g., opening a file). Although discussed with respect to an on-access virus scan, on-demand virus scans and other scans may also be performed using functionality provided by the in-guest agent 123. As shown, the method 200 begins at step 205, where an application 121 running in the guest OS 122 makes a file system call (e.g., an open or close system call). At step 210, the file system call is intercepted by the in-guest agent 123. At step 215, the in-guest agent 123 transmits a message which includes information about the file event (e.g., indicating the application making the file system call, the file being accessed, etc.) to multiplexer module 147, which routes the message to the antivirus process 131. As discussed, the multiplexer module 147 reads one layer of the guest OS introspection API 143 protocol to route messages, while the agent 123 and the antivirus process 131 read another layer of the protocol that implements API commands for guest OS introspection. In response to receiving the in-guest agent's 123 message, the antivirus process 131 transmits a request for data of the file that invokes a function provided by guest introspection API 143, and the message is routed by multiplexer 147 to VM 120$_1$, and, ultimately, the in-guest agent 123. At step 225, in-guest agent 123 transmits the requested file data to multiplexer 147, which routes the data to antivirus process 131. At step 230, antivirus process 131 scans the file data for viruses. At step 240, the antivirus process 148 invokes guest OS introspection API 143 again to remedy identified issues, if any. For example, VMware EPSEC API provides functions which may be invoked to delete, clean, truncate, and quarantine files.

Figure 3:
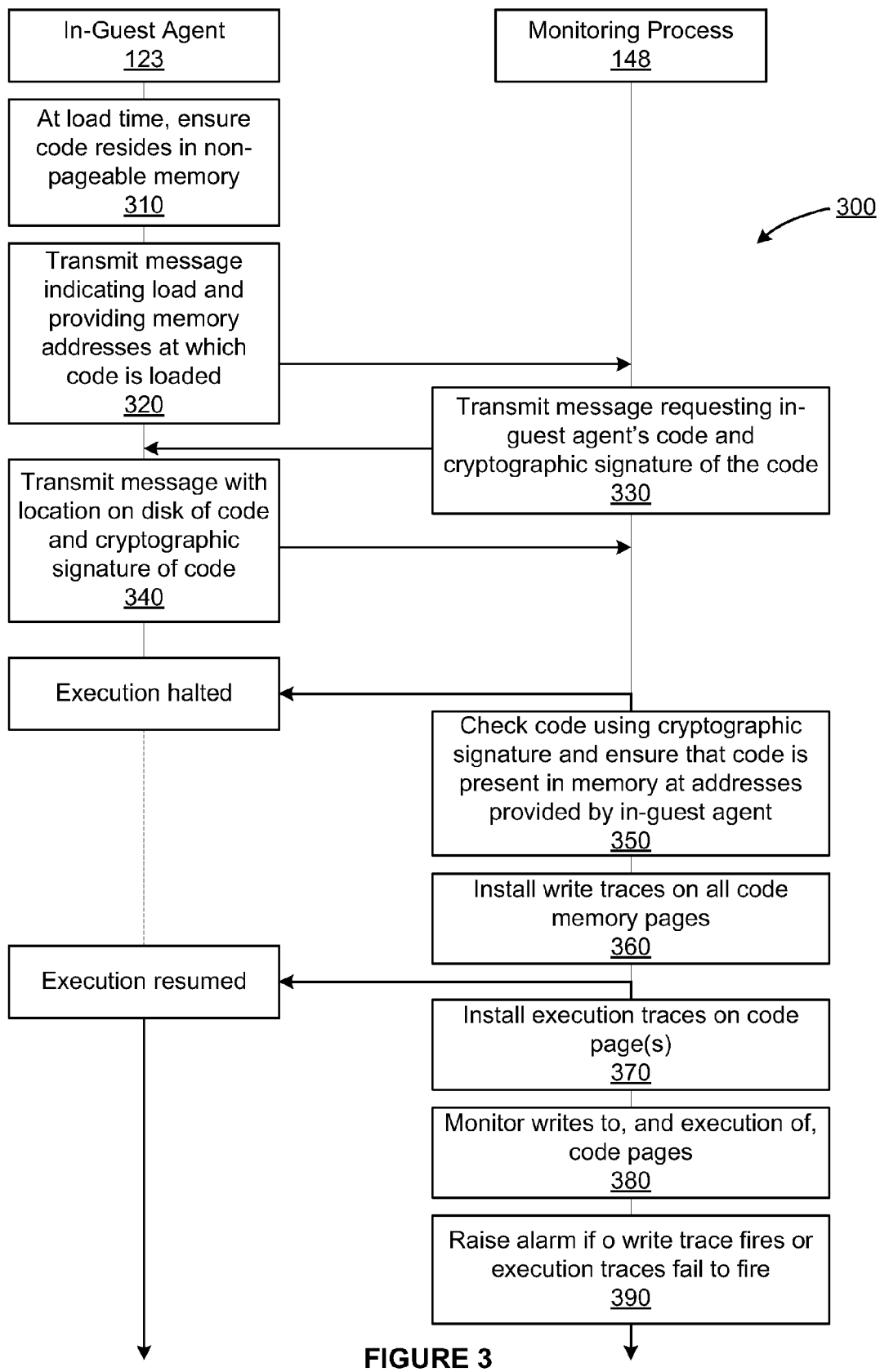
FIG. 3 illustrates a method for monitoring an in-guest agent, according to an embodiment of the invention.

One or more embodiments of the present invention provide techniques for monitoring the in-guest agent 123 to prevent execution of the software agent from being tampered with. As discussed, malicious entities may attempt to alter the in-guest agent's 123 code in memory or disable the in-guest agent 123 to evade detection by the antivirus process 131. FIG. 3 illustrates a method for monitoring the in-guest agent 123, according to one embodiment. As shown, the method 300 begins at step 310, where the in-guest agent 123 ensures, at load time, that its code is present in non-pageable memory. In order to monitor writes to memory pages associated with the in-guest agent 123, write traces may be placed on those memory pages. If the pages are swapped in or out during paging, however, the write traces will fire even though an alarm need not be raised in response to such swapping. Such false-positive write trace firings may be prevented by storing the in-guest agent 123's code in non-pageable memory. Operating systems commonly permit memory pages to be "pinned" such that those pages cannot be paged out. In one embodiment, memory pages storing the in-guest agent's 123 code may be pinned by installing the agent 123 as a kernel driver and performing other necessary steps so as to ensure that those memory pages are non-pageable.

In a further embodiment, the in-guest agent 123 may be compiled such that pages storing its code do not include other data or code. Similar to false-positive write trace firings that occur due to paging, write traces on pages storing the agent's 123 code may fire undesirably if other data or code that is stored in those same pages is modified, even if the code of the in-guest agent 123 itself is not modified. Compiling the agent 123 so that pages storing its code do not include other data or code may prevent such false-positive write trace firings.

At step 320, the in-guest agent 123 transmits a message to monitoring process 148 indicating that the agent's 123 code has been loaded and providing memory addresses at which the code was loaded. In one embodiment, the memory addresses may be provided via guest OS introspection API 14 and routed to the monitoring process by the multiplexer module 147. If memory addresses of the agent's 123 code were not provided by the agent 123 itself, then the monitoring process 148 would need to perform a memory scan to find the code, as the monitoring process 148 has no footprint in the guest VM. Moreover, if the in-guest agent's 123 code is not compiled to be position independent, the code may be modified by the process loaded based on the memory address at which it is loaded. Providing the actual memory addresses at which the in-guest agent's 123 code is loaded permits the monitoring process 148 to account for such code modifications when comparing the code in memory to code on disk.

At step 330, the monitoring process 148 transmits a message requesting a disk location of the in-guest agent 123's code and a cryptographic signature of the code. In one embodiment, the monitoring process may invoke a function provided by the guest OS introspection API 14 to request the location of the code and the cryptographic signature of the code, and the message itself may be routed by the multiplexer module 147. In response to the request, the in-guest agent 123 transmits a disk location of its code and a cryptographic signature of the code to the monitoring process 148 at step 340. As discussed, code signing may be used to verify authorship and integrity of code, thus ensuring that code provided by the in-guest agent 123 was authored by a trusted party and that the code has not been altered. Any feasible code-signing technique may be used. Note, in alternative embodiments, steps 330 and 340 may be replaced by an approach in which information about the in-guest agent 123 is provided through another channel to the monitoring process. In one embodiment, the monitoring process may itself maintain this information.

At step 350, the monitoring process 148 checks the code on disk of the in-guest agent 123 using the cryptographic signature and ensures that the code is present in memory at addresses provided by the in-guest agent 123. That is, the monitoring process 148 validates the authorship and integrity of the code at the disk location provided by the in-guest agent 123 and, assuming such validation is successful, the monitoring process 148 further compares the code on disk with the code loaded at memory addresses provided by the in-guest agent 123. Where the code is position dependent, the monitoring process 148 may account for any modifications to the code, as loaded in memory, based on the addresses provided by the in-guest agent 123. In one embodiment, the monitoring process 148 may invoke virtualization OS introspection API 151 to read GPPN pages provided by the in-guest agent 123 and compare the code on disk with the GPPN pages that are read, accounting for any modifications if the code is position dependent. For example, VMware's vCompute® API may be invoked to read particular GPPN pages if the VM is hosted on a VMWare ESX Server™.

At step 360, the monitoring process places write traces on memory pages storing the in-guest agent's 123 code. Doing so permits the monitoring process to detect modifications to those pages (by, e.g., a malicious entity). In one embodiment, functions provided by the virtualization OS introspection API 151, such as VMware's vCompute® API, may be invoked to place write traces. Write traces may be placed using synchronous execution to avoid time of check to time of use (TOCT-TOU) issues resulting from a race between the monitoring process attempting to place write traces on memory pages and other VM software attempting to modify the same pages. Illustratively, execution of the VM $120_1$ in which in-guest agent 123 runs, and execution of the agent 123 itself, may be halted during steps 350 and 360. For example, the monitoring process 148 may cause the VM $120_1$ to be suspended to halt execution of VM $120_1$.

At step 370, the monitoring process 148 places execution traces on certain code page(s). In one embodiment, the code pages on which execution traces are placed may be specified in the signed code to avoid tampering. That is, the signed code may indicate pages that should execute during normal operation of in-guest agent, and on which execution traces are to be placed. For example, execution traces may be used to verify periodic execution, and, in such a case, the execution traces may be placed at the beginning of each t millisecond interval. In such a case, the monitor process 147 may raise an alarm if an execution trace fails to fire by the end of any t millisecond interval.

In an alternative embodiment, the code being monitored may write to certain memory page(s) monitored via write trace(s). That is, the monitoring process 148 may place write traces on certain memory page(s) (e.g., memory page(s) specified in signed code), and raise an alarm if the write trace(s) fail to fire, indicating that execution of the agent has stopped. For example, the monitoring process 148 may placed a write trace on a given memory page, and the in-guest agent 123 may periodically write to that page. In such a case, the monitoring process 148 may ensure (e.g., based on an address indicated by an instruction pointer associated with a write instruction) that the in-guest agent 123 is writing to the memory page and, thus, that the in-guest agent 123 is still executing.

At step 380, the monitoring process 148 monitors writes to, and execution of, code pages by listening to the firing of write and execution traces placed on those code pages. The monitoring process 148 then raises an alarm, at step 390, if a write trace fires or if an execution trace fails to fire (e.g., periodically). As discussed, the firing of a write trace may indicate that the in-guest agent's 123 code has been tampered with, while an execution tracing failing to fire may indicate that the in-guest agent 123 is no longer executing. The monitoring process may raise an appropriate alarm in such situations, and any feasible response to the alarm may be taken. For example, the monitoring process 123 may notify a user, stop execution of the VM in which the in-guest agent 123 is running, kill the VM in which the in-guest agent 123 is running, and the like. Although shown in FIG. 3 as occurring after execution of in-guest agent 123 resumes, the monitoring of write traces and raising of alarms may also occur after the write traces are placed, but before execution of in-guest agent 123 resumes. That is, writes to memory pages while execution of in-guest agent 123 is halted may trigger the firing of the write traces, and an alarm may be raised in response thereto.

Advantageously, embodiments described herein permit monitoring of an agent running in a guest VM to ensure that its code is not tampered with and that the code is executing. The agent itself bootstraps monitoring without compromising overall security by indicating that it has loaded and providing the location in memory of its code, as well as the disk location of the code and a signature of the code, to a monitoring process that is external to the guest VM.

The various embodiments described herein may employ various computer-implemented operations involving data stored in computer systems. e.g., these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that VMs present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method to prevent tampering with a software component in a guest virtual machine, comprising:
   determining, by the software component, that code of the software component is loaded in non-pageable memory;
   transmitting, from the software component to a monitoring process external to the guest virtual machine, locations in the non-pageable memory at which the code is loaded;
   transmitting, from the software component to the monitoring process, a location in disk of the code;
   validating, by the monitoring process, that the locations in the non-pageable memory at which the code is loaded store code of the software component wherein the validating includes comparing the code at the location in disk of the code with memory content at the locations in the non-pageable memory at which the code is loaded;
   placing, by the monitoring process, at least one of execution and write traces on one or more pages of the non-pageable memory at which the code is loaded;
   monitoring, via the execution and write traces, execution of, and writes to, the one or more pages of the non-pageable memory at which the code is loaded, respectively; and
   generating an alarm if a write trace fires or if an execution trace fails to fire periodically.

2. The method of claim 1, wherein the software component is compiled such that the locations in the non-pageable memory which store the code of the software component do not include other code or data.

3. The method of claim 1, further comprising:
   transmitting, from the software component to the monitoring process a cryptographic signature of the code; and
   validating, by the monitoring process, code at the location in disk of the code using the cryptographic signature of the code.

4. The method of claim 3, wherein transmitting the locations in the non-pageable memory at which the code is loaded is performed following a load of the software component, and wherein transmitting the location in disk of the code and the cryptographic signature are performed upon a request from the monitoring process.

5. The method of claim 1, wherein the code is position dependent, and wherein the validating that the locations in the non-pageable memory at which the code is loaded store code of the software component accounts for modifications to the code during loading of the code.

6. The method of claim 1, wherein the placing of the write traces is performed using synchronous execution.

7. The method of claim 1, wherein the software component performs a periodic write to one of the pages of non-pageable memory at which the code is loaded.

8. The method of claim 1, wherein the monitoring process runs in virtualization software which manages a plurality of virtual machines.

9. A non-transitory computer-readable storage medium embodying computer program instructions for preventing tampering with a software component in a guest virtual machine, the computer program instructions implementing an operation, the operation comprising:
   determining, by the software component, that code of the software component is loaded in non-pageable memory;
   transmitting, from the software component to a monitoring process external to the guest virtual machine, locations in the non-pageable memory at which the code is loaded;
   transmitting, from the software component to the monitoring process, a location in disk of the code;
   validating, by the monitoring process, that the locations in the non-pageable memory at which the code is loaded store code of the software component wherein the validating includes comparing the code at the location in disk of the code with memory content at the locations in the non-pageable memory at which the code is loaded;
   placing, by the monitoring process, at least one of execution and write traces on one or more pages of the non-pageable memory at which the code is loaded;
   monitoring, via the execution and write traces, execution of, and writes to, the one or more pages of the non-pageable memory at which the code is loaded, respectively; and
   generating an alarm if a write trace fires or if an execution trace fails to fire periodically.

10. The computer-readable storage medium of claim 9, wherein the software component is compiled such that the locations in the non-pageable memory which store
    the code of the software component do not include other code or data.

11. The computer-readable storage medium of claim 9, the operation further comprising:
    transmitting, from the software component to the monitoring process, a cryptographic signature of the code; and
    validating, by the monitoring process, code at the location in disk of the code using the cryptographic signature of the code.

12. The computer-readable storage medium of claim 11, wherein transmitting the locations in the non-pageable memory at which the code is loaded is performed following a load of the software component, and wherein transmitting the location in disk of the code and the cryptographic signature are performed upon a request from the monitoring process.

13. The computer-readable storage medium of claim 9, wherein the code is position dependent, and wherein the validating that the locations in the non-pageable memory at which the code is loaded store code of the software component accounts for modifications to the code during loading of the code.

14. The computer-readable storage medium of claim 9, wherein the placing of the write traces is performed using synchronous execution.

15. The computer-readable storage medium of claim 9, wherein the software component performs a periodic write to a page monitored via a write trace.

16. The computer-readable storage medium of claim 9, wherein the monitoring process runs in virtualization software which manages a plurality of virtual machines.

17. A system, comprising:
    a processor; and
    a memory, wherein the memory includes a program for preventing tampering with a software component in a guest virtual machine, the program being configured to perform an operation for preventing tampering with a software component in a guest virtual machine, the operation comprising:

determining, by the software component, that code of the software component is loaded in non-pageable memory;

transmitting, from the software component to a monitoring process external to the guest virtual machine, locations in the non-pageable memory at which the code is loaded;

transmitting, from the software component to the monitoring process, a location in disk of the code;

validating, by the monitoring process, that the locations in the non-pageable memory at which the code is loaded store code of the software component wherein the validating includes comparing the code at the location in disk of the code with memory content at the locations in the non-pageable memory at which the code is loaded;

placing, by the monitoring process, at least one of execution and write traces on one or more pages of the non-pageable memory at which the code is loaded;

monitoring, via the execution and write traces, execution of, and writes to, the one or more pages of the non-pageable memory at which the code is loaded, respectively; and generating an alarm if a write trace fires or if an execution trace fails to fire periodically.

18. The system of claim 17, the operation further comprising:

transmitting, from the software component to the monitoring process, a cryptographic signature of the code; and validating, by the monitoring process, code at the location in disk of the code using the cryptographic signature of the code.

* * * * *